(12) United States Patent
Aaron et al.

(10) Patent No.: US 6,874,721 B2
(45) Date of Patent: *Apr. 5, 2005

(54) LEADER PIN SEAT FOR TAPE CARTRIDGES

(75) Inventors: Robert C. Aaron, Meridian, ID (US); Stephen V. Deckers, Eagle, ID (US); Tad D. Shupe, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/406,516

(22) Filed: Apr. 3, 2003

(65) Prior Publication Data

US 2003/0189120 A1 Oct. 9, 2003

Related U.S. Application Data

(63) Continuation of application No. 09/606,862, filed on Jun. 29, 2000, now Pat. No. 6,695,242.

(51) Int. Cl.[7] ............................................. G11B 23/107
(52) U.S. Cl. .................................................. 242/348.2
(58) Field of Search ............................ 242/348, 348.2; 403/329, 326, 327; 267/159

(56) References Cited

U.S. PATENT DOCUMENTS

| | | | | |
|---|---|---|---|---|
| 793,325 A | * | 6/1905 | Stiles | 403/209 |
| 2,112,247 A | * | 3/1938 | McLoughlin | 446/116 |
| 2,520,725 A | * | 8/1950 | Judd | 248/27.1 |
| 2,634,473 A | * | 4/1953 | Price | 248/298.1 |
| 3,119,574 A | | 1/1964 | Laa | |
| 3,154,261 A | | 10/1964 | Breuning | |
| 3,169,721 A | | 2/1965 | Laa | |
| 3,195,825 A | | 7/1965 | Louzil | |
| 4,131,305 A | | 12/1978 | Lopata | |
| 4,657,119 A | * | 4/1987 | Denree et al. | 188/79.51 |
| 4,920,436 A | | 4/1990 | Novak | |
| 4,977,474 A | | 12/1990 | Oishi et al. | |
| 6,236,539 B1 | | 5/2001 | Morita et al. | |
| 6,345,779 B1 | * | 2/2002 | Rambosek | 242/348.2 |
| 6,505,789 B2 | * | 1/2003 | Ridl et al. | 242/348.2 |
| 2003/0089810 A1 | * | 5/2003 | Schoettle et al. | 242/348.2 |
| 2003/0094532 A1 | * | 5/2003 | Hiraguchi | 242/348.2 |
| 2003/0122016 A1 | * | 7/2003 | Imai | 242/348.2 |

* cited by examiner

Primary Examiner—Donald P. Walsh
Assistant Examiner—Mark J. Beauchaine

(57) ABSTRACT

A retention spring for a tape cartridge that both secures a leader pin and operates as a wide angle guide for directing the leader pin into the access port of the cartridge as the tape is being rewound onto the supply reel. The retention spring includes pairs of opposing guides, retention grooves, and binding elements. The guides define an entry for receiving a portion of the leader pin while the retention grooves define a retention slot for at least partially surrounding a portion of the leader pin. The binding elements each define a transition between one guide and one retention groove while providing resistance as the leader pin is urged between the entry and the retention slot.

6 Claims, 7 Drawing Sheets

LEADER PIN SEAT FOR TAPE CARTRIDGES

CROSS REFERENCE TO RELATED APPLICATION

This is a continuation of application Ser. No. 09/606,862 filed Jun. 29, 2000 now U.S. Pat. No. 6,695,242.

FIELD OF THE INVENTION

This invention generally relates to a single reel tape cartridge. More particularly, this invention relates to a seat for receiving and securing a leader pin as the tape is rewound onto a supply reel housed within the cartridge.

BACKGROUND OF THE INVENTION

The evolution of tape data storage systems is similar to that of many computer components. At first, reel-to-reel systems (somewhat similar to old reel-to-reel audio tape recorders) were used to store data. In 1972, more than a decade before the introduction of the first IBM-PC, the 3M Company introduced the first dual reel quarter-inch tape cartridge designed for data storage. Somewhat more than a decade later, the first single reel tape cartridges and single reel cartridge tape drives were introduced.

Because single reel cartridges are less expensive to produce and require minimal storage space, they are becoming a popular alternative to dual reel cartridges. In fact, single reel cartridge drives are rapidly becoming the preferred design for high-capacity tape-based data storage solutions for data processing systems. Using 600 meters of 12.7 mm-wide tape wound on an reel with a 44 mm hub, a single reel cartridge can store approximately 100 gigabytes of uncompressed data and approximately 200 gigabytes if compressed.

Most single reel cartridges include a housing which encloses a single supply reel onto which a tape is wound. The housing includes an access port through which the tape may be retrieved. A leader pin is generally attached to the free end of the tape. The leader pin may be in the shape of a block, a sphere, a spheroid, a rod or even a T-shaped tab. The supply reel has a central drive hub exposed through a central aperture on one side of the housing. When the cartridge is inserted in a tape drive, a drive spindle engages the drive hub through the aperture in the housing, and a priming mechanism within the drive enters the access port, captures the leader pin, and either directly or indirectly threads the tape over the tape drive's read/write head attaching the tape to a take-up reel located within the tape drive. Data is transferred to and from the tape in a conventional manner.

After the tape has been accessed by the drive, it is rewound onto the supply reel and detached from the take-up reel so that the cartridge may be removed from the drive. Referring to FIG. 1, one or more retention springs 2 are commonly used to secure the leader pin 4 within the access port 6 once the tape is fully rewound onto the supply reel. This process is commonly referred to as a parking operation. Generally, the retention spring 2 is located on one side of the access port 6 while a guide surface 8—commonly formed as part of the cartridge housing—is located on the other. As the tape 9 is being rewound, the leader pin 4 enters the access port riding along the guide surface 8 into a parking slot created by the retention springs 2. The guide surface 8 must be opposite the retention springs 2 to prevent the leader pin 4 from jamming into the retention springs 2 and damaging the cartridge. Avoiding the retention springs 2 during a parking operation narrows the space or "window" through which the leader pin 4 may be received into the access port 6. Enlarging the width of this window, increases reliability of repeated parking operations.

What is needed is an improved retention spring.

SUMMARY OF THE INVENTION

Accordingly, the invention is directed to a retention spring for a tape cartridge that both secures a leader pin and operates as a wide angle guide for directing the leader pin into the access port of the cartridge as the tape is being rewound onto the supply reel. The retention spring includes pairs of opposing guides, retention grooves, and binding elements. The guides define an entry for receiving a portion of the leader pin while the retention grooves define a retention slot for at least partially surrounding a portion of the leader pin. The binding elements each define a transition between one guide and one retention groove while providing resistance as the leader pin is urged between the entry and the retention slot.

DESCRIPTION OF THE DRAWINGS

FIG. 5 shows the seat as the tape is being rewound through the access port on a tape cartridge.

DETAILED DESCRIPTION OF THE INVENTION

Figure 1:
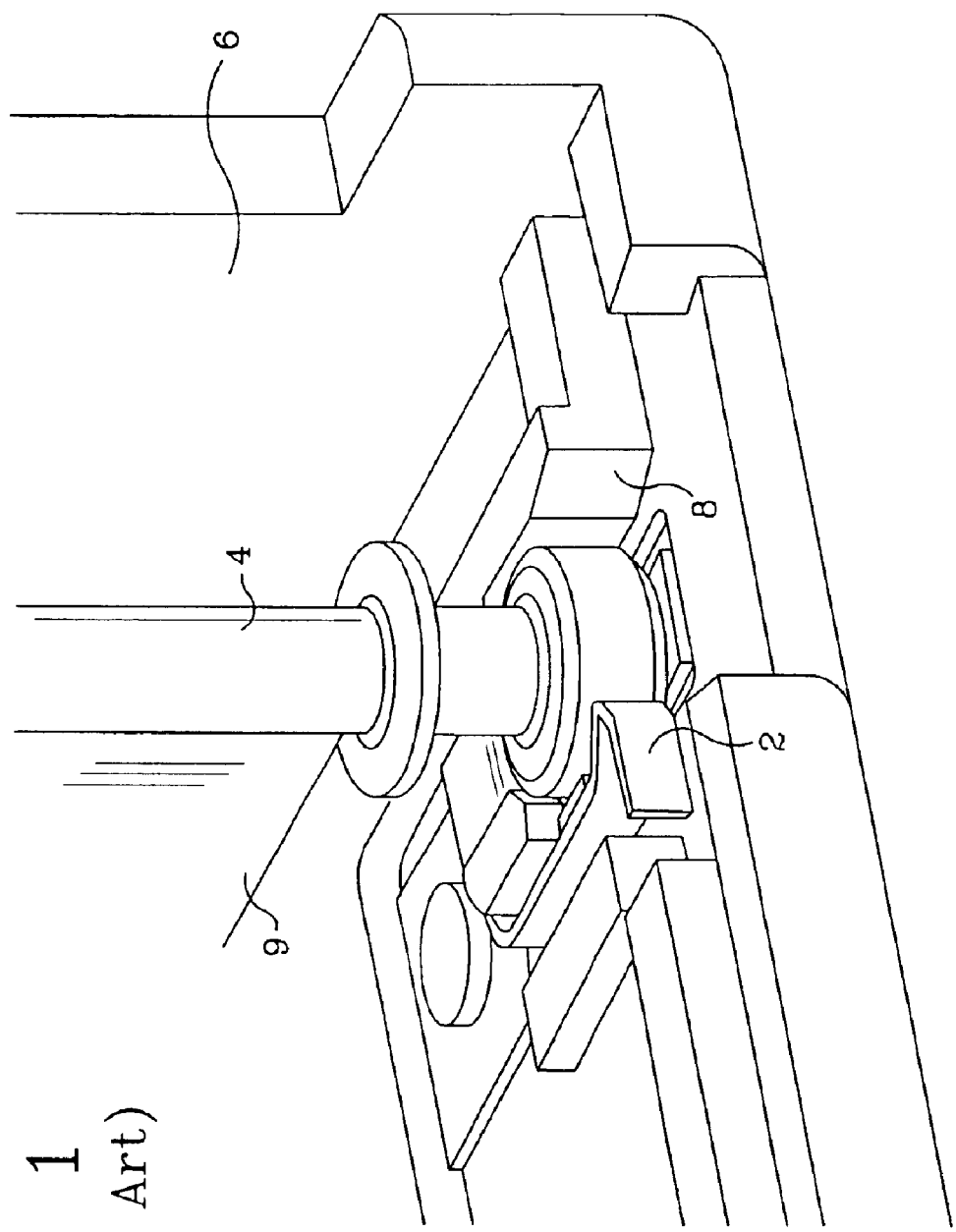
FIG. 1 is a perspective view of a conventional retention spring within the access port of a tape cartridge.
Figure 2:
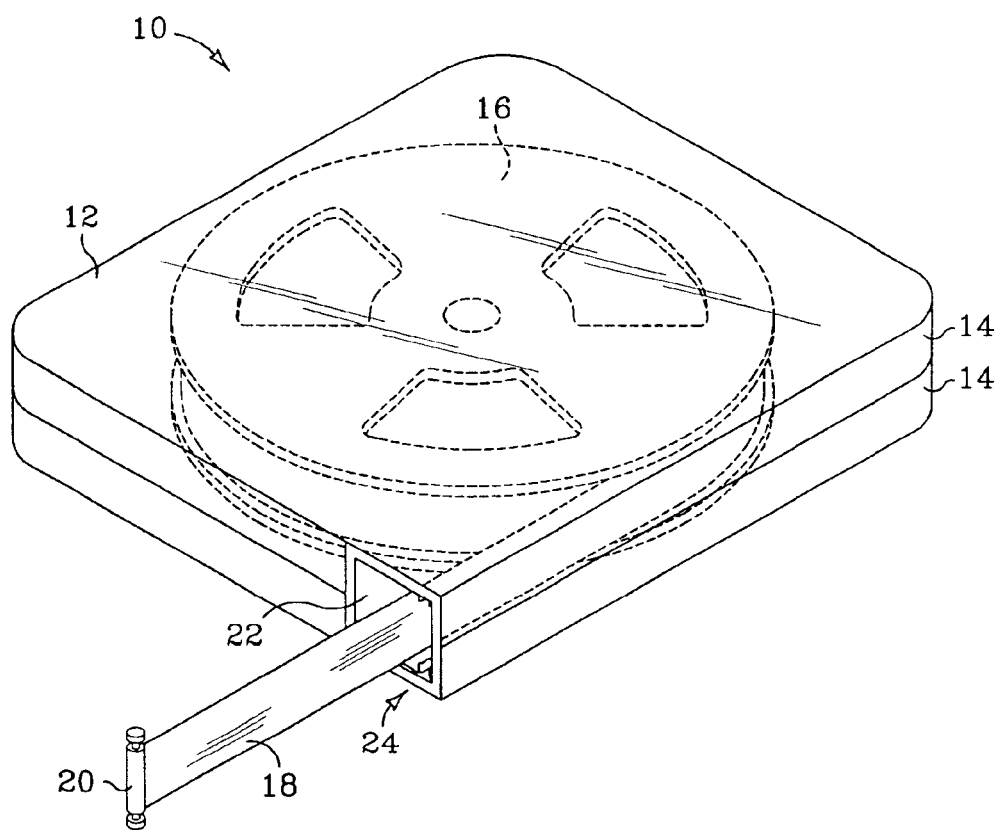
FIG. 2 is a perspective view illustrating the general components of a single reel tape cartridge into which the present invention may be incorporated.

A conventional single reel tape cartridge 10 into which the present invention may be incorporated is depicted in FIG. 2. The cartridge 10 includes a housing 12 formed by shells 14. Shells 14 encloses tape supply reel 16. One end of tape 18 is coupled to supply reel 16 while the other end, coupled to leader pin 20, extends out through access port 22. When tape 18 is fully rewound onto supply wheel 16, seat 24 (described in greater detail below) secures leader pin 20 within access port 22.

Figure 3:
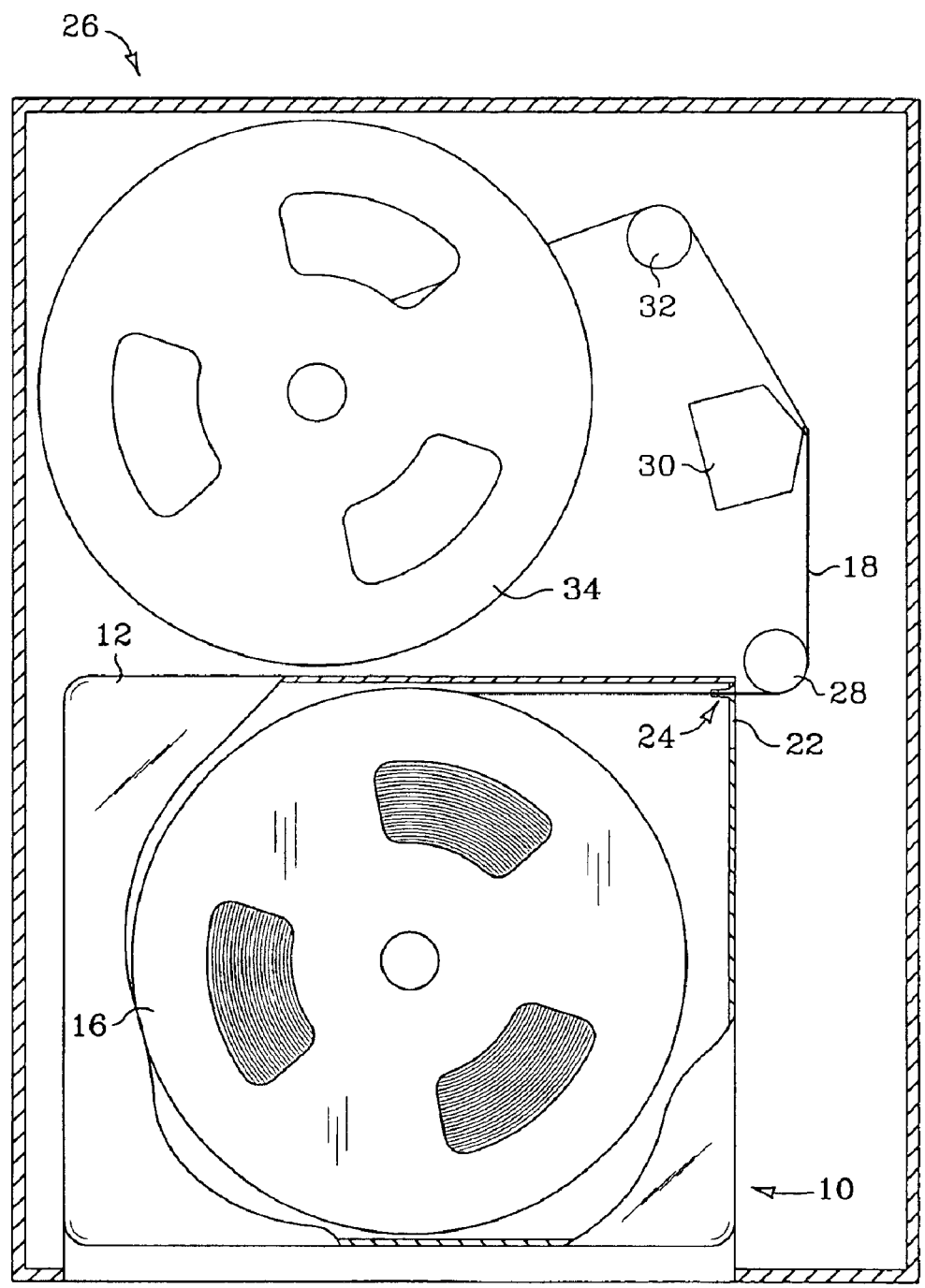
FIG. 3 is a cut-away top plan view of a single reel tape cartridge drive having a single reel tape cartridge inserted therein.

FIG. 3 illustrates tape cartridge 10 inserted into tape drive 26. It should be understood that no attempt has been made show all the features of tape cartridge 10 or tape drive 24. The purpose of this drawing, which is primarily a schematic diagram, is to show one possible path of tape 18, extending from supply reel 16 through access port 22, around first guide roller 28, over read/write head 30, around second guide roller 32, to take-up reel 34.

When cartridge 10 is inserted in tape drive 26, a drive mechanism engages supply reel 16 through housing 12, and a priming mechanism within tape drive 26 enters access port 22, separates leader pin 20 from seat 24, and either directly or indirectly threads tape 18 over read/write head 30 attaching tape 18 to take-up reel 34. Data is then transferred to or from tape 18 in a conventional manner. After tape 18 has been accessed by tape drive 26, tape 18 is rewound onto supply reel 16 and detached from take-up reel 34. Once fully rewound, seat 24 secures leader pin 20 within access port 22 so that cartridge 10 may be removed from tape drive 26.

Figure 4:
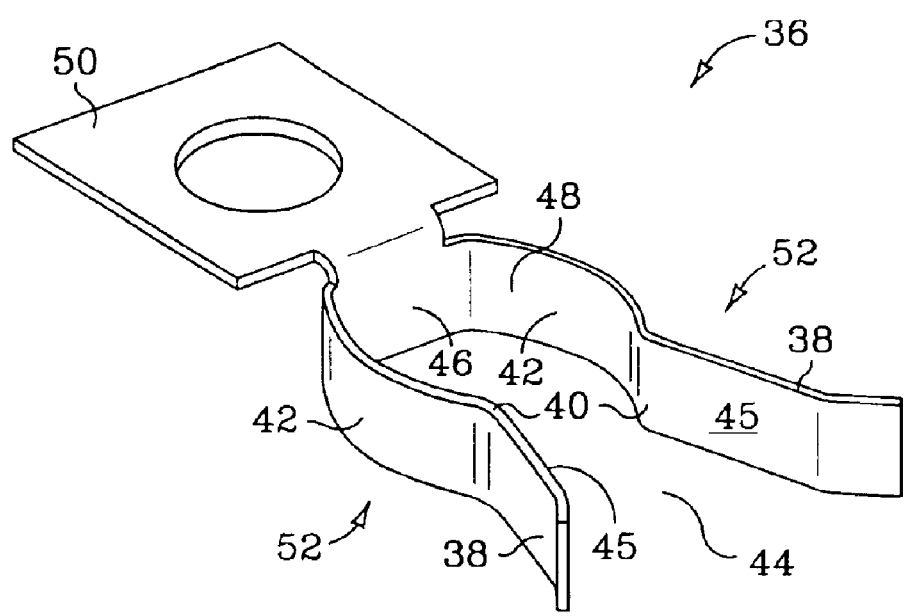
FIG. 4 is a perspective view of one embodiment of a retention spring according to one embodiment of the present invention.

In one embodiment, seat 24 includes retention spring 36 illustrated in FIG. 4. Retention spring 36 is formed by opposing pairs of guides 38, binding elements 40, and retention grooves 42. Guides 38 define a wide angle entry 44 for receiving a portion of leader pin 20. Retention grooves 42, joined along rear wall 46 define retention slot 48 for encompassing a portion of leader pin 20. Preferably, retention spring 36 also includes coupler 50 joined to rear wall 46 and used to secure retention spring 36 to housing 12 within access port 22. As tape 18 is fully rewound onto supply reel 16, binding elements 40 provide resistance against leader pin 20 as leader pin 20 is urged—in either direction—between entry 44 and retention slot 48. Each guide 38 provides a contact surface 45 for receiving a portion of the leader pin 20. As can bee seen in FIG. 4, the surface area of contact surfaces 45 is substantially equal to the surface area provided by retentions grooves 42 for retaining leader pin 20.

As shown in FIG. 4, binding elements 40 may each define a continuous and generally rounded transition between one guide 38 and one retention groove 42 thereby forming a pair of opposing curved arms 52. To provide the necessary resistance against leader pin 20, arms 52 can be formed by thin strips of metal or other resilient material. As retention pin 20 is urged into retention slot 48, leader pin 20 separates arms 52 as it slides passed binding elements 40. Once leader pin 20 is contained within retention slot 48, arms 52 return to their unseparated position securing leader pin 20 in place.

Alternatively, binding elements 40 might not form a continuous transition between guides 38 and retention grooves 42. As one of many possible examples, each binding element 40 may include a solid surface coupled to housing 12 with a spring. When leader pin is urged from entry 44 into retention slot 48, leader pin 20 presses against the solid surface compressing the springs against housing 12. Once leader pin 20 is in retention slot 48, the springs return to their uncompressed positions securing leader pin 20 in place.

Figure 5:
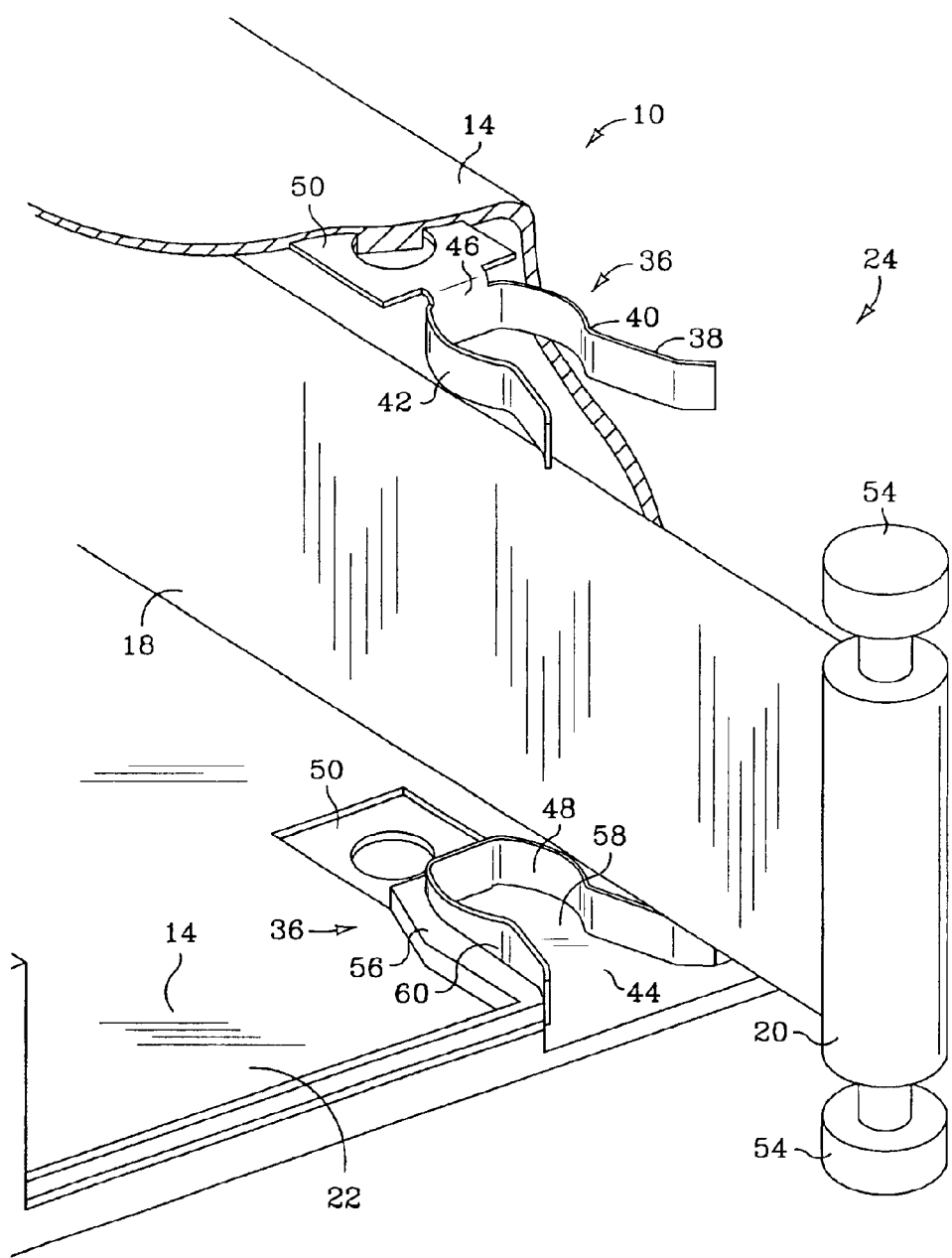
FIG. 5 is a cut-away perspective view of one embodiment of a seat that uses the retention spring of FIG. 4.
Figure 6:
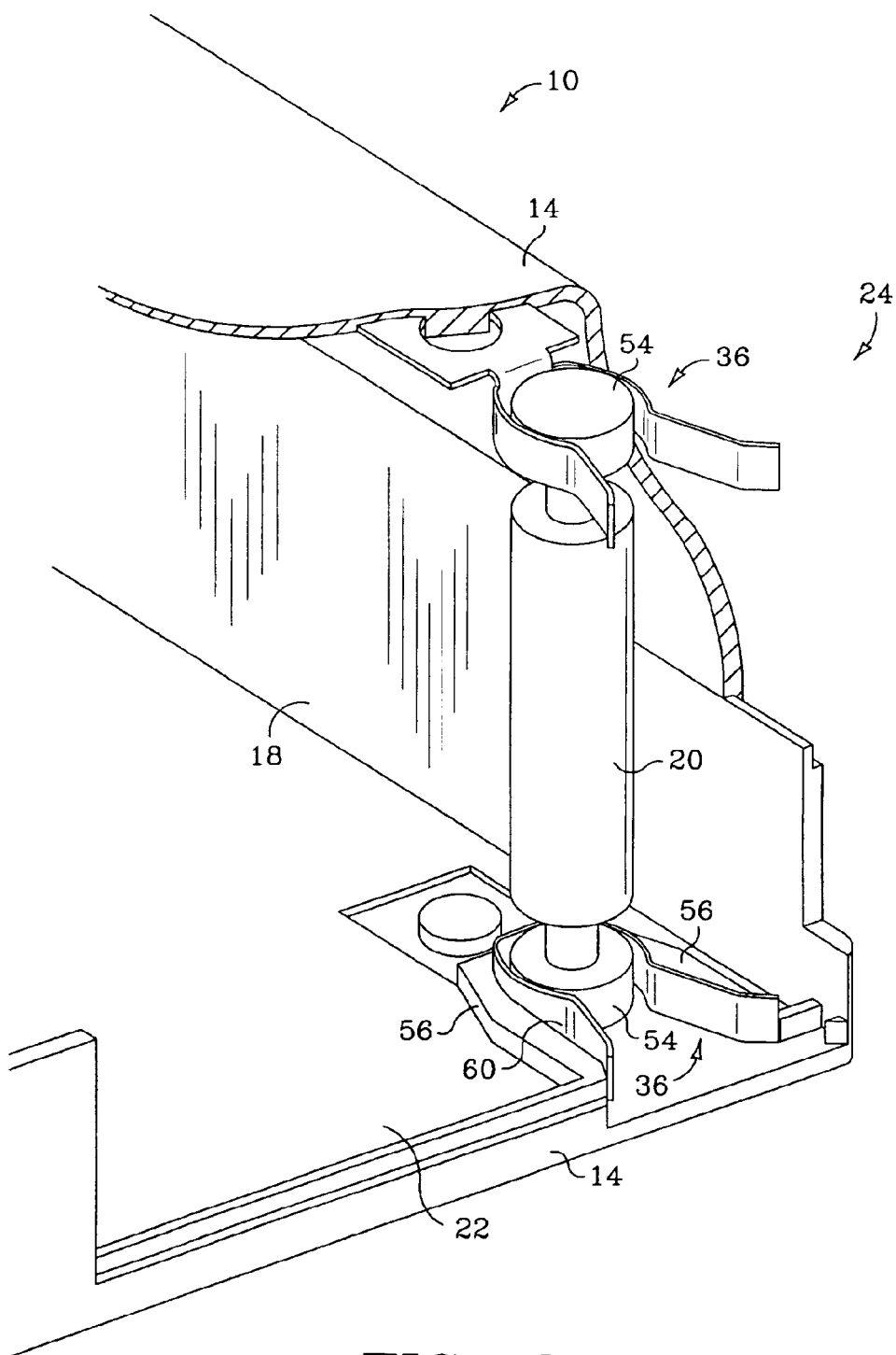
FIG. 6 is a cut-away perspective view of the leader pin secured by the seat of FIG. 5 once the tape is fully rewound.

Referring now to FIGS. 5 and 6, seat 24 will be described in more detail. Formed within access port 22, seat 24 includes retention springs 36 each coupled to an inside wall of one shell 14. Alternatively, retention springs 36 may be formed on the inside walls as integral parts of each shell 14. While shown as a rod, leader pin 20 may be in the shape of a block, a sphere, a spheroid, or even a T-shaped tab. As tape 18 is rewound, each end 54 of leader pin 20 slides through entry 44, separating binding elements 40, and coming to rest within retention slot 48. To increase the force required to separate binding elements 40, seating assembly 24 may also include retention walls 56 formed on the inside wall of each shell 14 and located within access port 22. Retention walls 56 form a channel 58 in which a retention spring 36 is seated.

Figure 7:
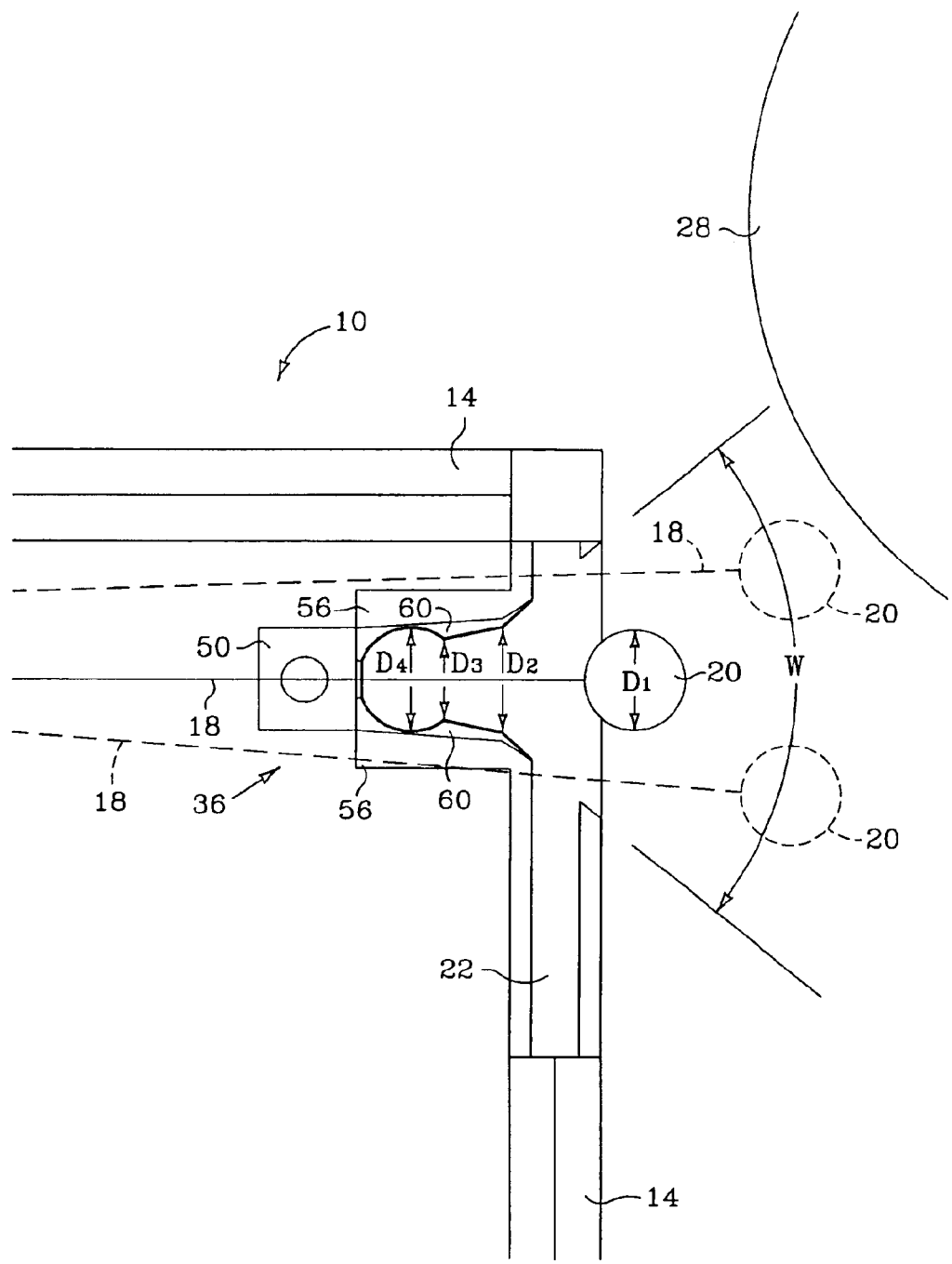
FIG. 7 is a close up top plan view of view of the seat of FIG. 5 according to one embodiment of the present invention.

Referring also now to FIG. 7, for each retention spring 36, portions of each guide 38 and each retention groove 42 are in contact with retention walls 56 creating gaps 60 between binding elements 40 and retention walls 56. Consequently, as leader pin 20 slides past binding elements 40, binding elements 40 are compressed against retention walls 56 while guides 38 and retention groves 42 remain stationary except for negligible deformations.

With reference to FIG. 7 it can be seen that the cross sectional diameter D1 of each end 54 of leader pin 20 is less than the width D2 of entry 44 but greater than the distance D3 between opposing uncompressed binding elements 40. When retention walls 56 are utilized, width D4 of each retention slot 48 should be at least equal to but may be larger than D1. Otherwise, D4 may be slightly less than D1 allowing retention slot 48 to more securely grip end 54 as leader pin 20 slides passed binding elements 40. FIG. 7 also illustrates window W through which leader pin 20 may be presented to seat 24 as tape 8 is rewound. Window W is an arc defined by guides 38—the larger the arc the less precision required to "park" leader pin 20 within seat 24.

The present invention has been shown and described with reference to the foregoing exemplary embodiments. It is to be understood, however, that other forms, details, and embodiments may be made without departing from the spirit and scope of the invention which is defined in the following claims.

What is claimed is:

1. A leader pin seat for use in combination with a single reel tape cartridge having a supply reel enclosed by a cartridge housing having an access port and a data storage tape having a first end coupled to the supply reel and a second end coupled to a leader pin, the seat comprising:

a first retention spring disposed within the access port at a location corresponding to one end of the leader pin, and a second retention spring disposed within the access port opposite the first retention spring at a location corresponding to another end of the leader pin, wherein each retention spring includes:

opposing grooves defining a retention slot for at least partially surrounding a portion of a leader pin;

opposing contact surfaces for receiving a portion of the pin as the pin is retracted from a first position outside the access port to a second position in which the pin is at least partially surrounded by the opposing grooves, wherein a surface area of the contact surfaces is substantially equal to or greater than a surface area of the grooves; and a coupler for joining the grooves to an inside wall of the cartridge.

2. The seat of claim 1, wherein each retention spring includes opposing binding elements each defining a transition between one contact surface and one retention groove.

3. A cartridge housing for a single reel tape cartridge comprising:

a shell encompassing a supply reel having a data tape with a first end coupled to the supply reel and a second end coupled to a leader pin;

a tape access port defined, at least in part, by the shell;

opposing retention springs configured to guide the leader pin into and secure the leader pin within the tape access port as the data tape is rewound onto the supply reel, wherein at least one of the retention springs includes:

opposing grooves defining a retention slot for at least partially surrounding a portion of the leader pin;

opposing contact surfaces for receiving a portion of the pin as the pin is retracted from a first position outside the tape access port to a second position in which the pin is at least partially surrounded by the opposing grooves, wherein a surface area of the contact surfaces is substantially equal to or greater than a surface area of the grooves; and a coupler for joining the retention grooves to the inside wall of the shell.

4. The cartridge housing of claim 3, wherein each retention spring includes opposing binding elements each defining a transition between one contact surface and one retention groove.

5. A single reel tape cartridge, comprising:

a cartridge housing having opposing shells;

a tape access port formed at least in part by the shells;

a tape supply reel rotatable within the housing;

a data storage tape having one end affixed to the supply reel and a second end coupled to a leader pin;

opposing retention springs configured to guide the leader pin into and secure the leader pin within the tape access port as the data tape is rewound onto the supply reel, wherein at least one of the retention springs includes:

opposing grooves defining a retention slot for at least partially surrounding a portion of a leader pin;

opposing contact surfaces for receiving a portion of the pin as the pin is retracted from a first position outside the tape access port to a second position in which the pin is at least partially surrounded by the opposing groves, wherein a surface area of the contact surfaces is substantially equal to or greater that-, a surface area of the grooves; and a coupler for joining the retention grooves to an inside wail of one shell.

6. The cartridge housing of claim 5, wherein each retention spring includes opposing binding elements each defining a transition between one contact surface and one retention groove.

* * * * *

UNITED STATES PATENT AND TRADEMARK OFFICE
CERTIFICATE OF CORRECTION

| | | |
|---|---|---|
| PATENT NO. | : 6,874,721 B2 | Page 1 of 1 |
| APPLICATION NO. | : 10/406516 | |
| DATED | : April 5, 2005 | |
| INVENTOR(S) | : Robert C. Aaron et al. | |

It is certified that error appears in the above-identified patent and that said Letters Patent is hereby corrected as shown below:

In column 4, line 14, after "tape" delete "8" and insert -- 18 --, therefor.

In column 6, line 7, in Claim 5, delete "groves" and insert -- grooves --, therefor.

In column 6, line 8, in Claim 5, delete "that-" and insert -- than --, therefor.

In column 6, line 11, in Claim 5, delete "wail" and insert -- wall --, therefor.

Signed and Sealed this

Twenty-eighth Day of July, 2009

JOHN DOLL
*Acting Director of the United States Patent and Trademark Office*